United States Patent
Hsu et al.

(10) Patent No.: US 8,620,963 B2
(45) Date of Patent: Dec. 31, 2013

(54) LARGE-SCALE DATA PROCESSING SYSTEM, METHOD, AND NON-TRANSITORY TANGIBLE MACHINE-READABLE MEDIUM THEREOF

(75) Inventors: Yi-Chen Hsu, Taipei (TW); Wenwey Hseush, Taipei (TW); Shih-Chang Hsu, Taipei (TW); Yi-Cheng Huang, Taipei (TW); Michael Chih Huong Fong, Taipei (TW)

(73) Assignee: eBizprise Inc., Taipei (TW)

( * ) Notice: Subject to any disclaimer, the term of this patent is extended or adjusted under 35 U.S.C. 154(b) by 170 days.

(21) Appl. No.: 13/415,585

(22) Filed: Mar. 8, 2012

(65) Prior Publication Data
US 2013/0238664 A1 Sep. 12, 2013

(51) Int. Cl.
*G06F 17/00* (2006.01)
(52) U.S. Cl.
USPC .......................................................... 707/797
(58) Field of Classification Search
None
See application file for complete search history.

(56) References Cited

U.S. PATENT DOCUMENTS

2006/0195460 A1* 8/2006 Nori et al. ..................... 707/100

* cited by examiner

*Primary Examiner* — Belix M Ortiz Ditren
(74) *Attorney, Agent, or Firm* — Christensen Fonder P.A.

(57) ABSTRACT

A large-scale data processing system, a large-scale data processing method, and a non-transitory tangible machine-readable medium are provided. The large-scale data processing system comprises an interface and a processor. The interface accesses a multi-dimensional data model, wherein the multi-dimensional data model comprises a plurality of dimensions, the dimensions form a multi-dimensional space of measures, each dimension is a single space comprising a plurality of members with a common set of attributes, and each measure is a data element organized and accessible through the multi-dimensional space of the cross-product of all dimensions. The processor builds at least one Tree Object (TO), wherein the TO is derived by converting the multi-dimensional data model into an N-level tree data structure according to a level order of N attributes, each tree node in the TO meets all conditions of attributes for all ancestor nodes, and N is a positive integer.

25 Claims, 4 Drawing Sheets

LARGE-SCALE DATA PROCESSING SYSTEM, METHOD, AND NON-TRANSITORY TANGIBLE MACHINE-READABLE MEDIUM THEREOF

CROSS-REFERENCES TO RELATED APPLICATIONS

Not applicable.

BACKGROUND OF THE INVENTION

1. Field of the Invention

The present invention relates to data processing system, method, and non-transitory tangible machine-readable medium thereof; more particularly, the present invention relates to large-scale data processing system, method, and non-transitory tangible machine-readable medium thereof.

2. Descriptions of the Related Art

With the rapid development in computer technologies, most enterprises collect, store, manipulate, and organize business information/data in computers in a systematic way. Relational databases and on-line analytical processing (OLAP) are examples of commonly adopted technologies.

Although various commercial products of relational databases and OLAP have been developed, they have limitations on processing the data stored within. Specifically, databases on the market today only provide data manipulation operations to retrieve and store data. In case a user needs to make analysis and perform computation on the data, such as summation, subtraction, multiplication, division, and the combination thereof, the user has to write a program himself/herself. When the calculation to be performed becomes complicated, writing a feasible and effective program becomes an uneasy task.

According to the above description, there is an urgent need for a large-scale data processing system and method that can organizes data stored in a database in an expressive and self-contained manner so that data can be easily calculated and manipulated.

SUMMARY OF THE INVENTION

To solve the aforesaid problem, the present invention provides a large-scale data processing system, a large-scale data processing method, and a non-transitory tangible machine-readable medium.

The large-scale data processing system of the present invention comprises an interface and a processor. The interface is configured to access a multi-dimensional data model stored in a storage device. The multi-dimensional data model comprises a plurality of dimensions, the dimensions form a multi-dimensional space of measures, each dimension is a single space comprising a plurality of members with a common set of attributes, and each measure is a data element organized and accessible through the multi-dimensional space of the cross-product of all dimensions. The processor is configured to access the multi-dimensional data model via the interface and build at least one Tree Object (TO), which represents a particular type of measure in the multi-dimensional space. The TO is derived by converting the multi-dimensional data model into an N-level tree data structure according to a level order of N attributes, each tree node in the TO meets all conditions of attributes for all ancestor nodes, and N is a positive integer.

The large-scale data processing method of the present invention is for use in an electronic apparatus. The large-scale data processing method comprises the following steps of: (a) accessing a multi-dimensional data model stored in a storage device, wherein the multi-dimensional data model comprises a plurality of dimensions, the dimensions form a multi-dimensional space of measures, each of the dimensions is a single space comprising a plurality of members with a common set of attributes, and each measure is a data element organized and accessible through the multi-dimensional space of the cross-product of all dimensions, and (b) building at least one TO by converting the multi-dimensional data model into an N-level tree data structure according to a level order of N attributes, each tree node in the TO is a place holder for (time series) data elements and meets all conditions of attributes for all ancestor nodes, and N is a positive integer.

The non-transitory tangible machine-readable medium of the present invention is stored with a computer program comprising a plurality of codes. The codes of the computer program are able to execute a large-scale data processing method when the computer program is loaded into an electronic apparatus. The codes comprise code A and code B. Code A enables the electronic apparatus to access a multi-dimensional data model stored in a storage device, wherein the multi-dimensional data model comprises a plurality of dimensions, the dimensions form a multi-dimensional space of measures, each of the dimensions is a single space consisting of a plurality of members with a common set of attributes, and each measure is a data element organized and accessible through the multi-dimensional space of the cross-product of all dimensions. Code B enables the electronic apparatus to build at least one TO by converting the multi-dimensional data model into an N-level tree data structure according to a level order of N attributes, each tree node in the TO meets all conditions of attributes for all ancestor nodes, and N is a positive integer.

For a multi-dimensional data model, the large-scale data processing system and large-scale data processing system of the present invention builds at least one TO by converting the multi-dimensional data model into an N-level tree data structure according to a level order of N attributes. The TO carries information stored in the database and is expressive and self-contained. Hence, measures/data of the TO can be easily calculated, processed, and manipulated by simple instructions.

The detailed technology and preferred embodiments implemented for the subject invention are described in the following paragraphs accompanying the appended drawings for people skilled in this field to well appreciate the features of the claimed invention.

DESCRIPTION OF THE PREFERRED EMBODIMENT

In the following descriptions, the large-scale data processing system, method, and non-transitory tangible machine-readable medium thereof of the present invention will be explained with reference to embodiments thereof. However, these embodiments are not intended to limit the present invention to any specific environment, applications, or particular implementations described in these embodiments. Therefore, description of these embodiments is only for purpose of illustration rather than to limit the present invention. It should be appreciated that elements unrelated to the present invention are omitted from depiction in the following embodiments and the attached drawings.

Figure 1A:
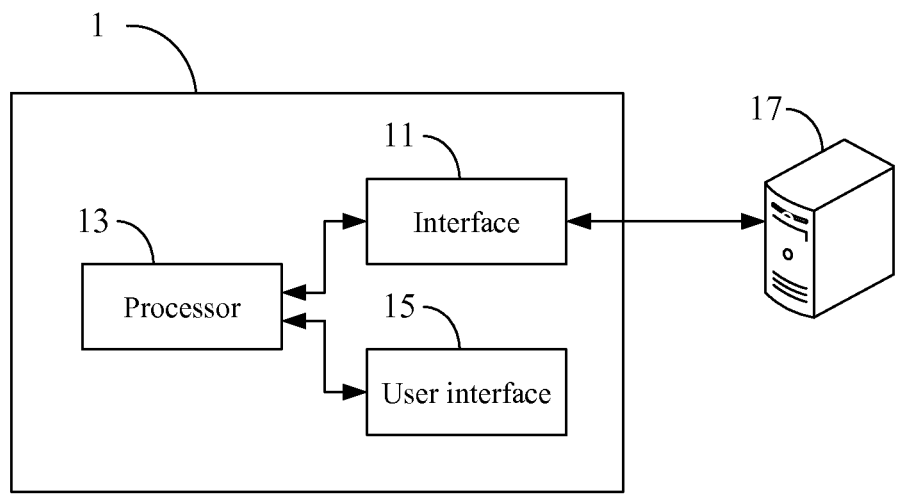
FIG. 1A illustrates a scenario of using a large-scale data processing system of the present invention.

A first embodiment of the present invention is illustrated in FIG. 1A, which is a scenario of using a large-scale data processing system 1 of the present invention. The large-scale data processing system 1 comprises an interface 11, a processor 13, and a user interface 15, wherein the processor 13 is electrically connected to the interface 11 and the user interface 15. The interface 11 may be any interface that can be connected to a storage device. The processor 13 may be any of various processors, central processing units (CPUs), microprocessors, or other computing devices well known to those of ordinary skill in the art. The user interface 15 may be any interface that can be controlled by a user and is able to generate an instruction according to the control of the user.

There is a storage device 17 stored with a multi-dimensional data model. The multi-dimensional data model comprises a plurality of dimensions. The dimensions form a multi-dimensional space of measures, wherein each measure is a data element organized and accessible through the multi-dimensional space of the cross-product of all dimensions. Each dimension is a single space comprising a plurality of members with a common set of attributes; that is, the members in a dimension can be described by a set of attributes.

Figure 1B:
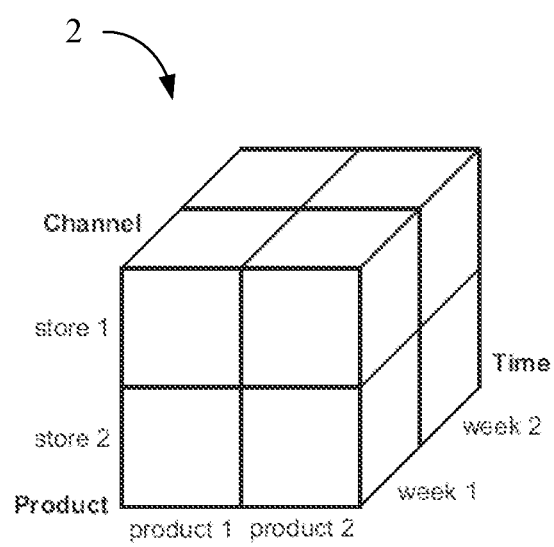
FIG. 1B illustrates an example of a multi-dimensional data model.

FIG. 1B illustrates an example of a multi-dimensional data model 2, which is designed for a company. In this example, the multi-dimensional data model 2 comprises three dimensions, including "product", "channel", and "time". The three dimensions "product", "channel", and "time" form a three-dimensional space of measures. The "product" dimension is a single space comprising two members, including "product 1" and "product 2". In this example, each member in the "product" dimension has three attributes, including the category of the product, the color of the product, and the stock-keeping units (sku) of the product. These attributes can be referred to as "product.category", "product.color", and "product,sku".

Likewise, the "channel" dimensional is a single space that comprises two members, including "store 1" and "store 2". In this example, each member in the "channel" dimension has three attributes, including the area of the channel, the city of the channel, and the store of the channel. These attributes can be referred to as "channel.area", "channel.city", and "channel.store". Similarly, the "time" dimension is a single space that comprises two members, including "week 1" and "week 2". In this example, each member in the "time" dimension has three attributes, including year, month, and week. These attributes can be referred to as "time.year", "time.month", and "time.week".

Figure 1C:
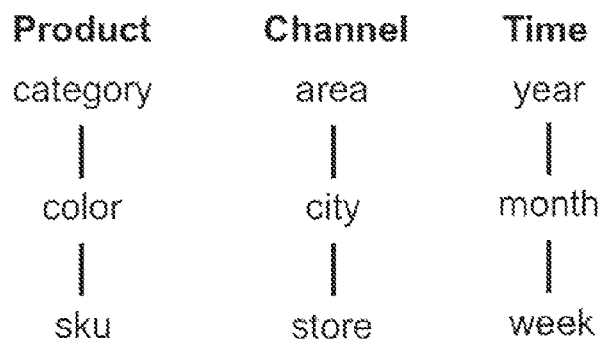
FIG. 1C illustrates a hierarchy of relationships between attributes.

The attributes may be related and form a hierarchy of relationships as shown in FIG. 1C. Note that the attributes of different dimensions might be related to each other as well. For example, it is possible that some categories of products are only sold in certain stores in the channel.

In addition, the multi-dimensional data model 2 comprises at least one measure, wherein each of the at least one measure is a data element organized and accessible through the multi-dimensional space of the cross-product of all dimensions. The measures are the data and information that users want to analyze. For example, actual sales and sales forecast are measures to derive achieving rate in the supply chain planning domain.

In order to perform large-scale data processing, the user inputs a location of the multi-dimensional data model stored in the storage device 17 via the user interface 15. After inputting the location, the interface 11 is electrically connected to the storage device 17 so that the large-scale processing system 1 is able to access the multi-dimensional data model via the interface 11.

Then, the processor 13 builds at least one Tree Object (TO) of the multi-dimensional data model. Specifically, the processor 13 derives the at least one TO by converting the multi-dimensional data model into an N-level tree data structure according to a level order of N attributes. The level order of the N attributes may be pre-defined or inputted by a user through the user interface 15. Each tree node in the at least one TO meets all conditions of the attributes for all ancestor nodes and N is a positive integer.

Figure 1D:
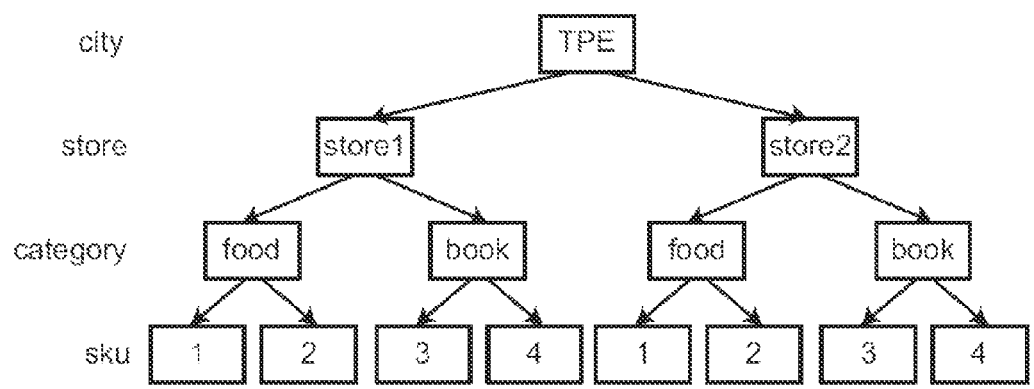
FIG. 1D illustrates a Tree Object that is built according to a level order.

The process of building a TO corresponding to the multi-dimensional data model 2 is given below. The positive integer N is four in this example and the level order of N attributes is: channel.city, channel.store, product.category, and product.sku. The level order of the N attributes can be represented as follows, channel.city<channel.store<product.category<product.sku, wherein the expression "a1<a2" denotes that the level of the attribute a1 is higher than the attributes a2. In other words, the attribute a1 is the ancestor of the attribute a2. FIG. 1D shows the TO that is built according to the above level order. From FIG. 1D, it can be easily understood that a TO in the present invention is an ordered directed tree with hierarchies derived from the multi-dimensional data model. Each level of the TO corresponds to an attribute of the multi-dimensional data model.

A node in the TO can be identified by a path condition beginning from the root node of the TO to the node being identified. In a preferred embodiment, the path condition can be described by XPath. For example, when a path condition "/TPE/store1/food/1" is applied to the TO shown in FIG. 1D, the product node with the following characteristics is identified: having sku equaling to 1, belonging to the food category, and being sold at store 1 in Taipei. That is, the left-most child node in the bottom level of the TO of FIG. 1D is identified by the path condition "/TPE/store1/food/1". When intending to identify a subtree in a TO, the symbol "*" can be used. For example, when applying a path condition "/TPE/store1/*" to the TO shown in FIG. 1D, all products sold at store 1 in Taipei are identified.

The TO can be accessed and processed via various operations, such as Select operation, Split operation, Join operation, Replicate operation, Merge operation, Transform operation, Aggregate operation, Distribute operation, arithmetic operation, logical operation, comparison operation, λ operation, age process, and update process. Each of them will be elaborated in the below paragraphs.

Select Operation:

In order to perform the Select operation, a path condition described by XPath is inputted by the user via the user interface 15. The path condition represents a sequence of attributes corresponding to the level order of the TO. Afterwards, the processor 13 locates the at least one located subtree that meets the path condition.

Split Operation:

In order to perform the Split operation, a path condition described by XPath is inputted by the user via the user interface 15. The path condition represents a sequence of attributes corresponding to the level order of the TO. Afterwards, the processor 13 selects a set of subtrees according to the path condition and detaches each subtree from its parent node into a split TO. It is noted that each split TO is represented by an instance of the path condition.

A practical use of Split operation is to adopt parallel processing technology in a way that the processor 13 may have the TO distributively assign the computational task associated with each subtree to a different machine. Each split TO is treated as an independent TO and thus performs a computational task of smaller scale.

Join Operation:

The Join operation is applied to TOs that have been split. In order to perform the Join operation, an instance of the path condition corresponding to a split TO is inputted by the user via the user interface 15. The processor 13 locates a leaf node of the TO by the instance of the path condition corresponding to the split TO and attaches the split TO to the leaf node of the TO. In addition to the Split operation, the Join operation collects the computation result in each split TO as the final result.

Replicate Operation:

The user can input a Replication instruction via the user interface 15. In response to the Replication instruction, the processor 13 performs a Replicate operation by generating a cloned TO of the TO, and the cloned TO and the TO have identical structure and node contents. In practice, a user may need to simulate a sequence of operations on the TO for testing purpose. With Replicate operation, the user can have the processor 13 to perform a what-if scenario analysis on a cloned TO without affecting the base TO.

Merge Operation:

The Merge operation is applied to at least one cloned TO. The user can input a Merge instruction indicating the at least one cloned TO has to be merged via the user interface 15. After the processor 13 receives the Merge instruction, the processor 13 performs a Merge operation by merging the content of the cloned TO into the TO. As a consequence of the aforementioned simulation, the user estimates the outcome from a what-if scenario analysis and decides to have the processor 13 bring the changes made on the cloned TO back to the base TO.

Transform Operation:

When the user intends to view the TO from different angles, the Transform operation is required. The user can input a Transform instruction via the user interface 15 to enable the processor 13 to perform the Transform operation. The Transform instruction comprises a new level order, which is a subset of the level order of the TO. After receiving the Transform instruction, the processor 13 generates a transformed TO by rearranging the structure of the TO according to the new level order. The transformed TO meets the following condition:

$\forall$ leaf node $n \in TO_2$,
$S(n)=\{x|x \in TO_1, XPath(x) \text{ contains } XPath(n)\}$,
Measures of $n=sum(S(n))$, wherein the variable $TO_1$ represents TO, the variable $TO_2$ represents the transformed TO, the function sum( ) is a summarization function that takes the content of the set of nodes and produces a data element. Then, the processor 13 calculates a new data element for each node in the transformed TO by aggregating its child nodes.

Aggregate Operation:

The user can input an Aggregation instruction via the user interface 15. After receiving the Aggregation instruction, the processor 13 performs an Aggregate operation by applying a $\lambda$ TO to the TO in a bottom-up order. It is noted that the $\lambda$ TO and the TO have the identical tree structure and each node of the $\lambda$ TO is an aggregation function that calculates a new data element for the corresponding node in the TO by aggregating its child nodes. A common example for using Aggregation operation is that a user of management role needs to acquire the overall sales revenue from all channels and all products.

Distribute Operation:

The user can input a Distribute instruction via the user interface 15. After receiving the Distribute instruction, the processor 13 performs a Distribute operation by applying a $\lambda$ TO to the TO in a top-down order. It is noted that the $\lambda$ TO and the TO have the identical tree structure and each node of the $\lambda$ TO is a distribution function that distributes the node content to its child nodes in the TO. A great example of Distribute operation is that a user of management role needs to evenly or (proportionally by a factor) allocate resources down to each store in all cities.

Arithmetic Operation:

The user can input an arithmetic instruction via the user interface 15 in order to instruct the processor 13 to perform an arithmetic operation between the TO and another TO that has the identical tree structure with the TO. Specifically, the arithmetic instruction may be an instruction for performing addition, subtraction, multiplication, division, assignment, modular, comparison, or negation. Depending on the content of the arithmetic instruction, the processor 13 performs the arithmetic operation between the nodes of the TO and the nodes of another TO in a one-on-one fashion.

Logical Operation:

The user can input an logical instruction via the user interface 15 in order to instruct the processor 13 to perform a logical operation to the TO or to perform a logical operation between the TO and another TO that has the identical tree structure with the TO. Specifically, the logical instruction may be an instruction for performing AND, OR, XOR, or NOT operations. When the content of the logical instruction is for performing AND, OR, or XOR operation, the processor 13 performs the logical operation between the nodes of the TO and the nodes of another TO in a one-on-one fashion. When the content of the logical instruction is for performing NOT operation, the processor 13 performs the logical operation on the TO.

Comparison Operation:

The user can input a comparison instruction via the user interface 15 in order to instruct the processor 13 to perform a comparison operation between the TO and another TO that has the identical tree structure with the TO. It is noted that the comparison operation is performed between the nodes of the TO and the nodes of another TO in a one-on-one fashion.

$\lambda$ Operation:

The user can input an instruction via the user interface 15 to instruct the processor 13 to apply a $\lambda$ TO to the TO. It is noted that the $\lambda$ TO and the TO have the identical tree structure and each node of the $\lambda$ TO carries an operator. The operators in the $\lambda$ TO may be the same or different. The processor 13 applies the $\lambda$ TO to the TO in a one-on-one fashion.

Figure 1E:
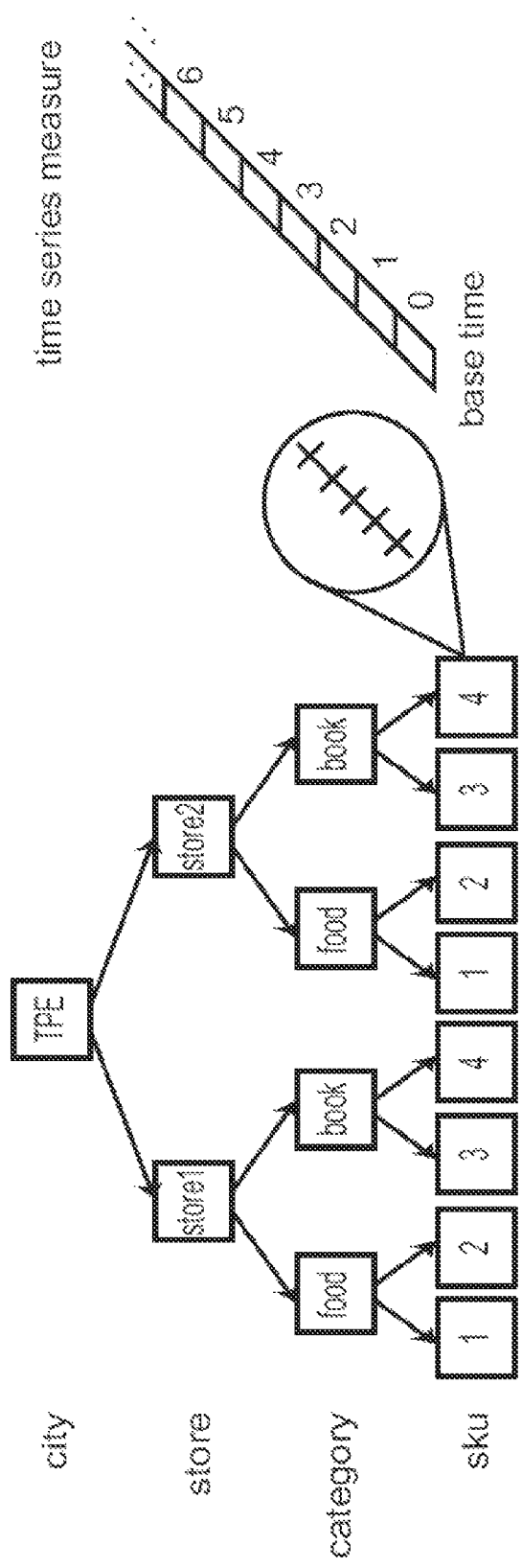
FIG. 1E illustrates a Tree Object having time-series data.

Age Process:

In a preferred embodiment, the data element in each node of the TO is a time-series of data as shown in FIG. 1E. The time-series may include information about the base time, time unit, and duration. Time unit is the basic unit that the user tries to measure time, such as a week, a month, a quarter, or a year. A time series measure (or a time series data) contains all measures (data) accessible during the period specified by the time series.

When the data element in each node is a time-series of data, the user can input an age instruction via the user interface 15.

After receiving the age instruction, the processor 13 performs an ageing process on the TO by retrieving a plurality of new measures from the multi-dimensional data model and updating the time-series of data in the TO. In order to provide accurate real-time data analysis, all measures needs to be in synchronization with the multi-dimensional data model. The Age process enables the large-scale data processing system 1 to refresh the latest data from the multi-dimensional data model.

Update Process:

The user can input an update instruction via the user interface 15 to instruct the processor 13 to perform an update process by pushing the local changes of the TO back to the multi-dimensional data model. For the same purpose of seamless data analysis, The Update process enables the system to update the system data to the multi-dimensional data model.

According to the above description, it is understood that the large-scale data processing system 1 builds at least one TO by converting the multi-dimensional data model into an N-level tree data structure according to a level order of N attributes. Therefore, users can easily manipulate the at least one TO by various operations.

Figure 2:
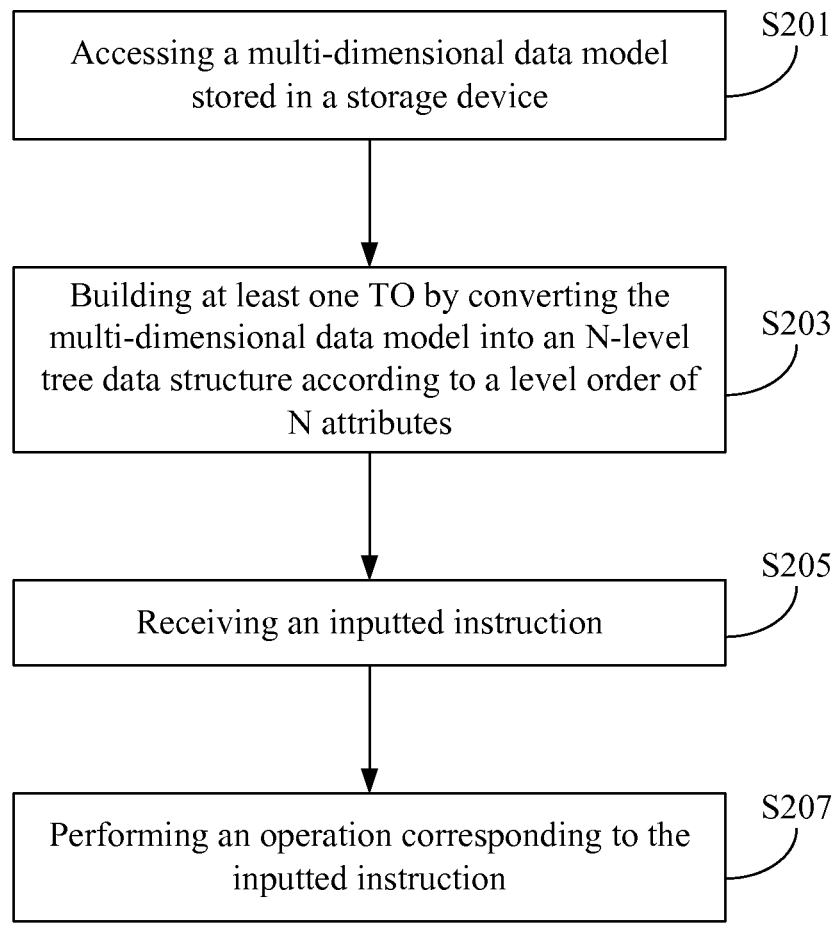
FIG. 2 illustrates the flowchart of a large-scale data processing method of the present invention.

A second embodiment of the present invention is a large-scale data processing method, whose flowchart is illustrated in FIG. 2. The large-scale data processing method can be used in an electronic apparatus, such as the large-scale data processing system 1 in the first embodiment.

First, the large-scale data processing method execute step S201 to enable the electronic apparatus to access a multi-dimensional data model stored in a storage device. The multi-dimensional data model comprises a plurality of dimensions. The dimensions form a multi-dimensional space of measures, wherein each measure is a data element organized and accessible through the multi-dimensional space of the cross-product of all dimensions. Each dimension is a single space comprising a plurality of members with a common set of attributes; that is, the members in a dimension can be described by a set of attributes.

Then, the large-scale data processing method execute step S203 to enable the electronic apparatus to build at least one TO by converting the multi-dimensional data model into an N-level tree data structure according to a level order of N attributes. It is noted that each tree node in the TO meets all conditions of attributes for all ancestor nodes and N is a positive integer.

A user can input various instructions in order to enable the electronic apparatus to perform various operations on the TO. The inputted instruction is received by the large-scale data processing method at step S205. Then, the large-scale data processing method executes step S207 to perform an operation corresponding to the inputted instruction. The operations include Select operation, Split operation, Join operation, Replicate operation, Merge operation, Transform operation, Aggregate operation, Distribute operation, arithmetic operation, logical operation, comparison operation, λ operation, age process, and update process.

When step S205 receives an inputted instruction regarding a Select operation and a path condition described by XPath, step S207 enables the electronic apparatus to perform the Select operation as addressed in the first embodiment in order to locate the at least one located subtree that meets the path condition.

When step S205 receives an inputted instruction regarding a Split operation and a path condition described by XPath, step S207 enables the electronic apparatus to perform the Split operation as addressed in the first embodiment in order to derive a split TO. Each split TO is represented by an instance of the path condition When step S205 receives an inputted instruction regarding a Join operation and a split TO, step S207 enables the electronic apparatus to perform the Join operation as addressed in the first embodiment.

Similarly, when step S205 receives an inputted instruction regarding a Replication operation and the TO, step S207 enables the electronic apparatus to perform the Replicate operation as addressed in the first embodiment in order to generate a cloned TO of the TO. The cloned TO and the TO have identical structure and node contents.

If step S205 receives an inputted instruction regarding a Merge operation and at least one cloned TO, step S207 enables the electronic apparatus to perform the Merge operation as addressed in the first embodiment to merge the at least one cloned TO back to the TO.

If step S205 receives an inputted instruction regarding a Transform operation and a new level order, step S207 enables the electronic apparatus to perform the Transform operation as addressed in the first embodiment to generate a transformed TO by rearranging the structure of the TO according to the new level order and calculating a new data element for each node in the transformed TO by aggregating its child nodes. It is noted that the new level order is a subset of the level order of the TO.

If step S205 receives an inputted instruction regarding an Aggregate operation, step S207 enables the electronic apparatus to perform the Aggregate operation as addressed in the first embodiment. On the other hand, if step S205 receives an inputted instruction regarding a Distribute operation, step S207 enables the electronic apparatus to perform the Distribute operation as addressed in the first embodiment.

When step S205 receives an inputted instruction regarding an arithmetic operation, the TO, and another TO having the identical structure with the TO, step S207 enables the electronic apparatus to perform the arithmetic operation between the nodes of the TO and the nodes of another TO in a one-on-one fashion. The arithmetic operation may be addition, subtraction, multiplication, division, assignment, modular, comparison, or negation.

When step S205 receives an inputted instruction regarding a logical operation, the TO, and another TO having the identical structure with the TO, step S207 enables the electronic apparatus to perform the logical operation as addressed in the first embodiment.

Likewise, if step S205 receives an inputted instruction regarding a comparison operation, the TO, and another TO having the identical structure with the TO, step S207 enables the electronic apparatus to perform the comparison operation between the nodes of the TO and the nodes of another TO in a one-on-one fashion.

In addition, if step S205 receives an inputted instruction regarding a λ operation, step S207 enables the electronic apparatus to perform the λ operation as addressed in the first embodiment.

In a preferred embodiment, the data element in each node of the TO is a time-series data. For this scenario, if step S205 receives an inputted instruction regarding an aging process, step S207 enables the electronic apparatus to perform the ageing process on the TO by retrieving a plurality of new measures from the multi-dimensional data model and updating the time-series of data in the TO.

Finally, if step S205 receives an inputted instruction regarding an update process, step S207 enables the electronic apparatus to perform the update process by pushing the local changes of the TO back to the multi-dimensional data model.

Depending on the requirement of the user, step S205 and step S207 can be executed as many times as needed. With the large-scale data processing method, a multi-dimensional data model can be transferred into at least one TO, which can be easily manipulated with various operations.

In addition to the aforesaid steps, the second embodiment can also execute all the operations and functions set forth in the first embodiment. How the second embodiment executes these operations and functions will be readily appreciated by those of ordinary skill in the art based on the explanation of the first embodiment, and thus will not be further described herein.

The large-scale data processing method described in the second embodiment may be implemented as a computer program. When the computer program is loaded into an electronic apparatus or a large-scale data processing system, a plurality of codes comprised in the computer program are able to perform the large-scale data processing method described in the second embodiment. This computer program may be stored in a tangible machine-readable medium, such as a read only memory (ROM), a flash memory, a floppy disk, a hard disk, a compact disk (CD), a mobile disk, a magnetic tape, a database accessible to networks, or any other storage media with the same function and well known to those skilled in the art.

According to the aforementioned description, it is learned that the present invention solves the problems of traditional databases by converting a traditional multi-dimensional data model into an N-level tree data structure. The TO carries information stored in the multi-dimensional database and is expressive and self-contained. Hence, measures/data of the TO can be easily calculated, processed, and manipulated by simple instructions, e.g. the instructions that request for Select operation, Split operation, Join operation, Replicate operation, Merge operation, Transform operation, Aggregate operation, Distribute operation, arithmetic operation, logical operation, comparison operation, λ operation, age process, and update process. Consequently, making a decision based on mass calculation of data becomes an easy job for users.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A large-scale data processing system, comprising:
an interface, being configured to access a multi-dimensional data model stored in a storage device, wherein the multi-dimensional data model comprises a plurality of dimensions, the dimensions form a multi-dimensional space of measures, each dimension is a single space comprising a plurality of members with a common set of attributes, and each measure is a data element organized and accessible through the multi-dimensional space of the cross-product of all dimensions; and
a processor, being electrically connected to the interface and configured to access the multi-dimensional data model via the interface and build at least one Tree Object (TO), wherein the TO is derived by converting the multi-dimensional data model into an N-level tree data structure according to a level order of N attributes, each tree node in the TO meets all conditions of attributes for all ancestor nodes, and N is a positive integer
wherein the processor further performs a Select operation for locating at least one subtree of the TO, the at least one located subtree meets a path condition described by XPath, and the path condition represents a sequence of attributes corresponding to the level order of the TO.

2. The large-scale data processing system of claim 1, wherein the processor further performs a Split operation by the following operations:
selecting a set of subtrees according to a path condition described by XPath, and
detaching each subtree from a parent node of the subtree into a split TO, wherein each split TO is represented by an instance of the path condition.

3. The large-scale data processing system of claim 2, wherein the processor further performs a Join operation for each split TO by the following operations:
locating a leaf node of the TO by the instance of the path condition corresponding to the split TO, and
attaching the split TO to the leaf node of the TO.

4. The large-scale data processing system of claim 1, wherein the processor further performs a Replicate operation by generating a cloned TO of the TO, and the cloned TO and the TO have identical structure and node contents.

5. The large-scale data processing system of claim 4, wherein the processor further performs a Merge operation by merging the content of the cloned TO into the TO.

6. The large-scale data processing system of claim 1, wherein the processor further performs a Transform operation by the following operations:
generating a transformed TO by rearranging the structure of the TO according to a new level order, wherein the new level order is a subset of the level order of the TO, and the transformed TO meets the following condition:
$\forall$ leaf node $n \in TO_2$,
$S(n) = \{x | x \in TO_1, XPath(x) \text{ contains } XPath(n)\}$,
Measures of $n = sum(S(n))$,
wherein the variable $TO_1$ represents TO, the variable $TO_2$ represents the transformed TO, the function sum( ) is a summarization function that takes the content of the set of nodes and produces a data element; and
calculating a new data element for each node in the transformed TO by aggregating child nodes of each of the nodes in the transformed TO.

7. The large-scale data processing system of claim 1, wherein the processor further performs an Aggregate operation by applying a λTO to the TO in a bottom-up order, the λTO and the TO have the identical tree structure, and each node of the λTO is an aggregation function that calculates a new data element for the corresponding node in the TO by aggregating child nodes of each of the nodes in the transformed TO.

8. The large-scale data processing system of claim 1, wherein the processor further performs a Distribute operation by applying a λTO to the TO in a top-down order, the λTO and the TO have the identical tree structure, and each node of the λTO is a distribution function that distributes the node content to the child nodes in the TO.

9. The large-scale data processing system of claim 1, wherein the processor further performs one of an arithmetic operation, a logical operation, and a comparison operation between the TO and anther TO having the same identical tree structure.

10. The large-scale data processing system of claim 1, wherein the processor further performs a λ operator by applying a λ TO to the TO and produces a new TO, and the λ TO and the TO have the identical tree structure.

11. The large-scale data processing system of claim 1, wherein the data element in each node is a time-series of data, the processor further performs an ageing process on the TO by retrieving a plurality of new measures from the multi-dimensional data model and updating the time-series of data.

12. The large-scale data processing system of claim 1, wherein the processor performs an update process by pushing the local changes of the TO back to the multi-dimensional data model.

13. A large-scale data processing method for use in an electronic apparatus, comprising the following steps of:
accessing a multi-dimensional data model stored in a storage device, wherein the multi-dimensional data model comprises a plurality of dimensions, the dimensions form a multi-dimensional space of measures, each of the dimensions is a single space comprising a plurality of members with a common set of attributes, and each measure is a data element organized and accessible through the multi-dimensional space of the cross-product of all dimensions;
building at least one Tree Object (TO) by converting the multi-dimensional data model into an N-level tree data structure according to a level order of N attributes, each tree node in the TO meets all conditions of attributes for all ancestor nodes, and N is a positive integer; and
performing a Transform operation by the following steps:
generating a transformed TO by rearranging the structure of the TO according to a new level order, wherein the new level order is a subset of the level order of the TO, and the transformed TO meets the following condition:

$$\forall \text{leaf node } n \in TO_2, S(n)=[x|x \in TO_1, XPath(x) \text{ contains } XPath(n)], \text{Measures of } n = sum(S(n)),$$

wherein the variable $TO_1$ represents TO, the variable $TO_2$ represents the transformed TO, the function sum( ) is a summarization function that takes the content of the set of nodes and produces a data element; and
calculating a new data element for each node in the transformed TO by aggregating child nodes of each of the nodes in the transformed TO.

14. The large-scale data processing method of claim 13, further comprising the step of:
performing a Select operation for locating at least one subtree of the TO, the at least one located subtree meets a path condition described by XPath, and the path condition represents a sequence of attributes corresponding to the level order of the TO.

15. The large-scale data processing method of claim 13, further comprising the step of:
performing a Split operation by the following steps:
selecting a set of subtrees according to a path condition described by XPath; and
detaching each subtree from a parent node of the subtree into a split TO, wherein each split TO is represented by an instance of the path condition.

16. The large-scale data processing method of claim 15, further comprising the step of:
performing a Join operation for each of the split TOs by the following steps:
locating a leaf node of the TO by the instance of the path condition corresponding to the split TO; and
attaching the split TO to the leaf node of the TO.

17. The large-scale data processing method of claim 13, further comprising the step of:
performing a Replicate operation by generating a cloned TO of the TO, wherein the cloned TO and the TO have identical structure and node contents.

18. The large-scale data processing method of claim 17, further comprising the step of:
performing a Merge operation by merging the content of the cloned TO into the TO.

19. The large-scale data processing method of claim 13, further comprising the step of:
performing an Aggregate operation by applying a λTO to the TO in a bottom-up order,
wherein the λTO and the TO have the identical tree structure, and each node of the λTO is an aggregation function that calculates a new data element for the corresponding node in the TO by aggregating child nodes of each of the nodes in the transformed TO.

20. The large-scale data processing method of claim 13, further comprising the step of:
performing a Distribute operation by applying a λTO to the TO in a top-down order,
wherein the λTO and the TO have the identical tree structure, and each node of the λTO is a distribution function that distributes the node content to the child nodes in the original TO.

21. The large-scale data processing method of claim 13, further comprising the step of:
performing one of an arithmetic operation, a logical operation, and a comparison operation between the TO and anther TO having the same identical tree structure.

22. The large-scale data processing method of claim 13, further comprising the step of:
performing a λ operator by applying a λ TO to the TO and produces a new TO,
wherein the λ TO and the TO have the identical tree structure.

23. The large-scale data processing method of claim 13, wherein the data element in each node is a time-series of data, and the large-scale data processing method further comprising the step of:
performing an ageing process on the TO by retrieving a plurality of new measures from the multi-dimensional data model and updating the time-series of data.

24. The large-scale data processing method of claim 13, further comprising the step of:
performing an update process by pushing the local changes of the TO back to the multi-dimensional data model.

25. A non-transitory tangible machine-readable medium, being stored with a computer program, the computer program comprising a plurality of codes, the codes being able to execute a large-scale data processing method when the computer program is loaded into an electronic apparatus, the codes comprising:
code A for enabling the electronic apparatus to access a multi-dimensional data model stored in a storage device, wherein the multi-dimensional data model comprises a plurality of dimensions, the dimensions form a multi-dimensional space of measures, each of the dimensions is a single space consisting of a plurality of members with a common set of attributes, and each measure is a data element organized and accessible through the multi-dimensional space of the cross-product of all dimensions;
code B for enabling the electronic apparatus to build at least one Tree Object (TO) by converting the multi-dimensional data model into an N-level tree data structure according to a level order of N attributes, each tree node in the TO meets all conditions of attributes for all ancestor nodes, and N is a positive integer; and code C for enabling the electronic apparatus to perform a Transform operation, comprising:

code C1 for enabling the electronic apparatus to generate a transformed TO by rearranging the structure of the TO according to a new level order, wherein the new level order is a subset of the level order of the TO, and the transformed TO meets the following condition:

$\forall$leaf node n$\in TO_2$, $S(n)=[x|x\in TO_1,$ XPath(x)containsXPath(n)], Measuresof n= sum(S(n)), wherein the variable $TO_1$ represents TO, the variable $TO_2$ represents the transformed TO, the function sum( ) is a summarization function that takes the content of the set of nodes and produces a data element; and code C2 for enabling the electronic apparatus to calculate a new data element for each node in the transformed TO by aggregating child nodes of each the nodes in the transformed TO.

\* \* \* \* \*